United States Patent [19]

Mattila

[11] Patent Number: 5,903,839
[45] Date of Patent: May 11, 1999

[54] METHOD AND APPARATUS TO PROVIDE MANUAL RESELECTION ON A DIGITAL CONTROL CHANNEL

[75] Inventor: Ilpo Mattila, Ruukki, Finland

[73] Assignee: Nokia Mobile Phones Limited, Espoo, Finland

[21] Appl. No.: 08/867,293

[22] Filed: Jun. 2, 1997

[51] Int. Cl.[6] .................................................. H04Q 7/20
[52] U.S. Cl. .................... 455/434; 455/452; 455/515; 455/62
[58] Field of Search .................................. 455/426, 423, 455/434, 432, 435, 458, 515, 450, 452, 62

[56] References Cited

U.S. PATENT DOCUMENTS

| | | | |
|---|---|---|---|
| 5,020,093 | 5/1991 | Pireh | 455/552 |
| 5,355,517 | 10/1994 | Olson | 455/510 |
| 5,475,862 | 12/1995 | Sawyer | 455/435 |
| 5,499,386 | 3/1996 | Karlsson | 455/444 |
| 5,570,467 | 10/1996 | Sawyer | 455/515 |
| 5,732,348 | 3/1998 | Norimatsu | 455/434 |
| 5,794,157 | 8/1998 | Haartsen | 455/522 |
| 5,839,075 | 11/1998 | Haartsen et al. | 455/450 |

*Primary Examiner*—Reinhard J. Eisenzopf
*Assistant Examiner*—Charles N. Appiah
*Attorney, Agent, or Firm*—Perman & Green, LLP

[57] ABSTRACT

A method for operating a mobile station (10) includes a first step of placing the mobile station in a camping state for receiving a control channel of a communications system. Prior to executing an evaluation of at least one other channels, the method determines if the current communications system was manually selected by a user. If not, the method executes the evaluation of the at least one other channel. If the current communications system was manually selected by the user, the method instead determines if the signal strength of the control channel is equal to or less than a threshold signal strength. If it is, the method executes the evaluation of the at least one other channel; else the method instead returns to the camping state without executing the evaluation of the at least one other channel.

6 Claims, 3 Drawing Sheets

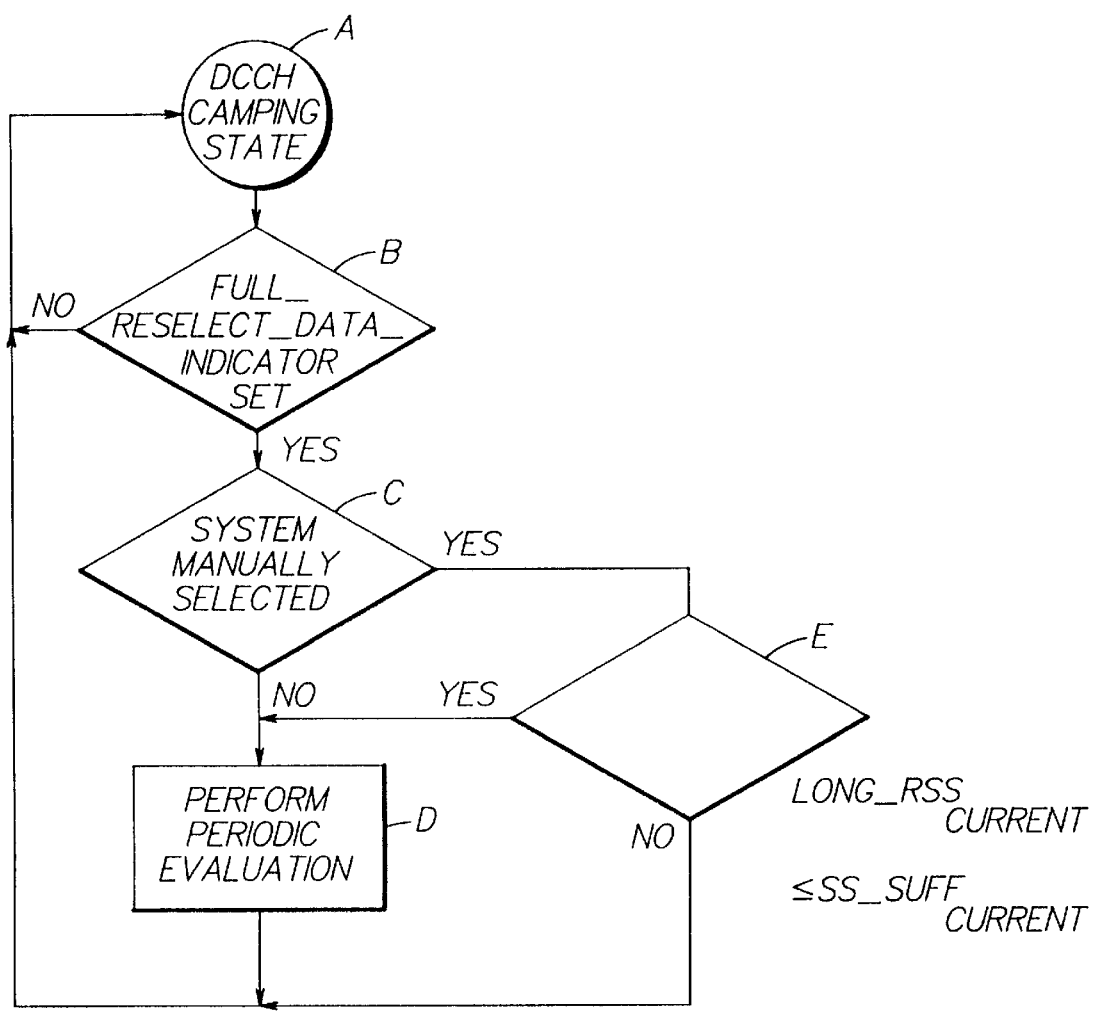

METHOD AND APPARATUS TO PROVIDE MANUAL RESELECTION ON A DIGITAL CONTROL CHANNEL

FIELD OF THE INVENTION

This invention relates generally to radiotelephones and, in particular, to radiotelephones or mobile stations such as those capable of operation with a cellular network

BACKGROUND OF THE INVENTION

In modern mobile telecommunications systems a mobile station may have a choice as to whether to operate with a public cellular system or with an autonomous system, such ti as a residential system of a private system Typically it will be desirable to operate with a selected autonomous system, which may provide a more favorable rate structure than the public cellular system(s), or that may provide a desired service not offered by the public cellular system(s). A particular autonomous system may be a residential system that serves the user's home, or a private system that serves the user's workplace.

One such modern cellular system is referred to as IS-136, which is described in IS-136.1, Rev. A, February 1996, and subsequent updated releases. This system employs Digital Control Channels (DCCHs) that enable a mobile station to gain access to the system. When a mobile station scans for and subsequently monitors a DCCH, it is said to be "ucamped" on that particular DCCH. Page messages and other information are received from the DCCH.

In Section 6.3.19 of IS-136.1 there is described a non-public mode search procedure that is to be implemented by IS-136 compliant mobile stations. As defined, while camping on a DCCH a mobile station user may decide to initiate a Non-Public Mode Search Condition in order to search for service with an alternate system (System Identification (SID), Private System Identification (PSID), or Residential System Identification (RSID)) on the current DCCH and/or other DCCHs. Two possible procedures are defined for Non-Public Mode Search: New PSID/RSID Search and Manual System Search.

Discussing first the New PSID/RSID Search procedure, when the user invokes this procedure the mobile station proceeds to collect one signal strength measurement on each frequency in the current frequency band. Next, the mobile station makes a list of up to 24 channels with the strongest signals, and then tunes to the strongest channel in the list. The mobile station then determines if this channel contains a DCCH. If the channel contains a DCCH, the mobile station reads the Fast Broadcast Control Channel (F-BCCH) and determines therefrom if the DCCH is marked with a non-public Network Type (Private and/or Residential) that is enabled in the mobile station. If this is the case, the mobile station marks the DCCH as DCCH_1. If the channel does not contain a DCCH, or if the DCCH is not marked with a non-public Network Type that is enabled in the mobile station, then a determination is made if this is the last channel in the channel list. If it is, the procedure ends, otherwise the mobile station reads the next strongest channel in the channel list and the process repeats.

After possibly performing a Test Registration procedure, and marking an appropriate PSID/RSID as SYS_1, the mobile station displays an indication of SYS_1 to the user. This enables the user to select SYS_1, using the mobile station's user interface (e.g., keypad). After other processing, a determination is made if DCCH_1 is the current DCCH. If it is not, the mobile station adds DCCH_1 to a list of channels identified as requiring measurements (see Section 6.3.3.1, Control Channel Locking) The mobile station then, after an appropriate delay required for channel measurement purposes (see Section 6.3.3.3), declares a Priority System Condition (see Section 6.2.3) using DCCH_1 as the only reselection candidate. The CELLTYPE for DCCH_1 defaults to PREFERRED until otherwise determined In addition, the mobile station determines the MS_ACC PWR, RSS_ACC MIN, SS _SUFF and DELAY (see Section 6.3.3.4.2) for DCCH_1 prior to involving or while executing the Control Channel Reselection procedure (see Section 6.3.3).

In the Manual System Search procedure, the mobile station proceeds as follows. The mobile station first searches the current DCCH and neighboring DCCHs (including Private Operating Frequencies (POFs) if they exist) for all candidates that support one or more of the PSIDs, RSIDs, and all SIDs that the mobile station subscribes to. The mobile station then displays a PSID/RSID Alphanumeric Name of each PSID or RSID supported by the candidate control channels that match a PSID or RSID stored in the mobile station, and the Alphanumeric System ID of the preferred SID. The mobile station then marks as DCCH_1 the candidate control channel supporting the SID, PSID, or RSID matching the Alphanumeric System ID or PSID/RSID Alphanumeric Name selected by the user using the mobile station's user interface. If more than one candidate control channel supports the selected PSID, RSID, or SID, then the candidate with the highest signal strength is marked as DCCH_1. If no SID, PSID, or RSID is selected by the user, the procedure is simply terminated.

If DCCH_1 is not the current DCCH, then the mobile station performs the same steps as described above for the New PSID/RSID search procedure, i.e., adding DCCH_1 to the list of channels identified as requiring measurements, etc.

Section 6.2.3 of IS-136.1 specifies the operation of the mobile station in a DCCH Camping State. Upon entering this state from a Control Channel Scanning and Locking state (Section 6.2.2), or for the first time as a result of control channel reselection, the mobile station always makes an initial reading of a full cycle of the F-BCCH and the Extended Broadcast Control Channel (E-BCCH). When operating in this state the mobile station does not make an access attempt until it has completed its initial reading of a full cycle of the F-BCCHI. After completing its initial reading of the F-BCCH, the mobile station leaves the DCCH Camping state in order to process any of a number of specified transactions These transactions include, but are not limited to, the occurrence of an originated or a terminated call, a registration, and an originated point to point teleservice.

The Layer 3 controller of the mobile station remains in the DCCH camping state as long as it is logically connected to the best DCCH according to control channel (re)selection rules. While in the DCCH Camping State the mobile station is specified to respond to the occurrence of a number of different conditions. These include, but are not limited to, a determination that an Analog Control Channel (ACC) is a preferred service provider, a radio link failure, and, of most interest to this invention, a Periodic Evaluation condition.

The Periodic Evaluation condition, as currently-defined, exists whenever the mobile station decides to evaluate the signal strength performance of other DCCHs. This condition is specified to occur at least once every SCANINTERVAL (see Section 6.3.3.1) when a Full_Reselect_Data_

Indicator is set (see Section 6.3.3.3). Whenever this condition is detected the mobile station invokes a Control Channel Reselection procedure (see Section 6.3.3) using the results obtained according to a Signal Strength Measurements procedure (see Section 6.3.2.3). A Neighbor List having entries acquired on the current DCCH, Private Operating Frequencies (see Section 6.3.21) and/or a DCCH identified as a result of a Non-Public Mode Search (see Section 6.3.19) can all serve as candidates for cell reselection.

However, this conventional technique causes a problem when the user has manually selected either a SID, PSID, or RSID using the procedure described above. In this case, and assuming that the mobile station has camped on the DCCH of the manually selected system, the above-described Periodic Evaluation procedure will result almost immediately in the mobile station beginning to scan for another, stronger DCCH. This can result in the mobile station reselecting to another DCCH, thereby defeating and overriding the user's manual selection of a particular system. It can be appreciated that this type of operation will be objectionable to the user.

OBJECTS OF THE INVENTION

It is thus a first object of this invention to provide an improved method for executing a periodic system reselection task in a mobile station.

It is a further object of this invention to provide a method, and a mobile station constructed to operate in accordance with the method, for executing a periodic system reselection task, when operating with a manually selected system, only on an occurrence of a condition wherein one or more predetermined criterion are met.

It is another object of this invention to provide a method, and a mobile station constructed to operate in accordance with the method, for executing a periodic system reselection task, when operating with a manually selected system, only on an occurrence of a condition wherein the signal strength of the manually selected system falls below a predetermined threshold level.

SUMMARY OF THE INVENTION

The foregoing and other problems are overcome and the objects of the invention are realized by methods and apparatus in accordance with embodiments of this invention.

A method in accordance with this invention is disclosed for operating a mobile station, the method including a first step of placing the mobile station in a camping state for receiving a control channel of a communications system. The method further includes, prior to executing an evaluation of at least one other channel, a step of determining if the current communications system was manually selected by a user. If not, the method executes the evaluation of the at least one other channel If the current communications system was manually selected by the user, the method instead determines if the signal strength of the control channel is equal to or less than a threshold signal strength. If the signal strength of the control channel is determined to be equal to or less than the threshold signal strength, the method executes the evaluation of the at least one other channel; else if the signal strength of the control channel is determined to be greater than the threshold signal strength, the method instead returns to the camping state without executing the evaluation of the at least one other channel.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a logic flow diagram that illustrates a method of this invention that is executed by the mobile station of FIGS. 1 and 2.

DETAILED DESCRIPTION OF THE INVENTION

Figure 1:
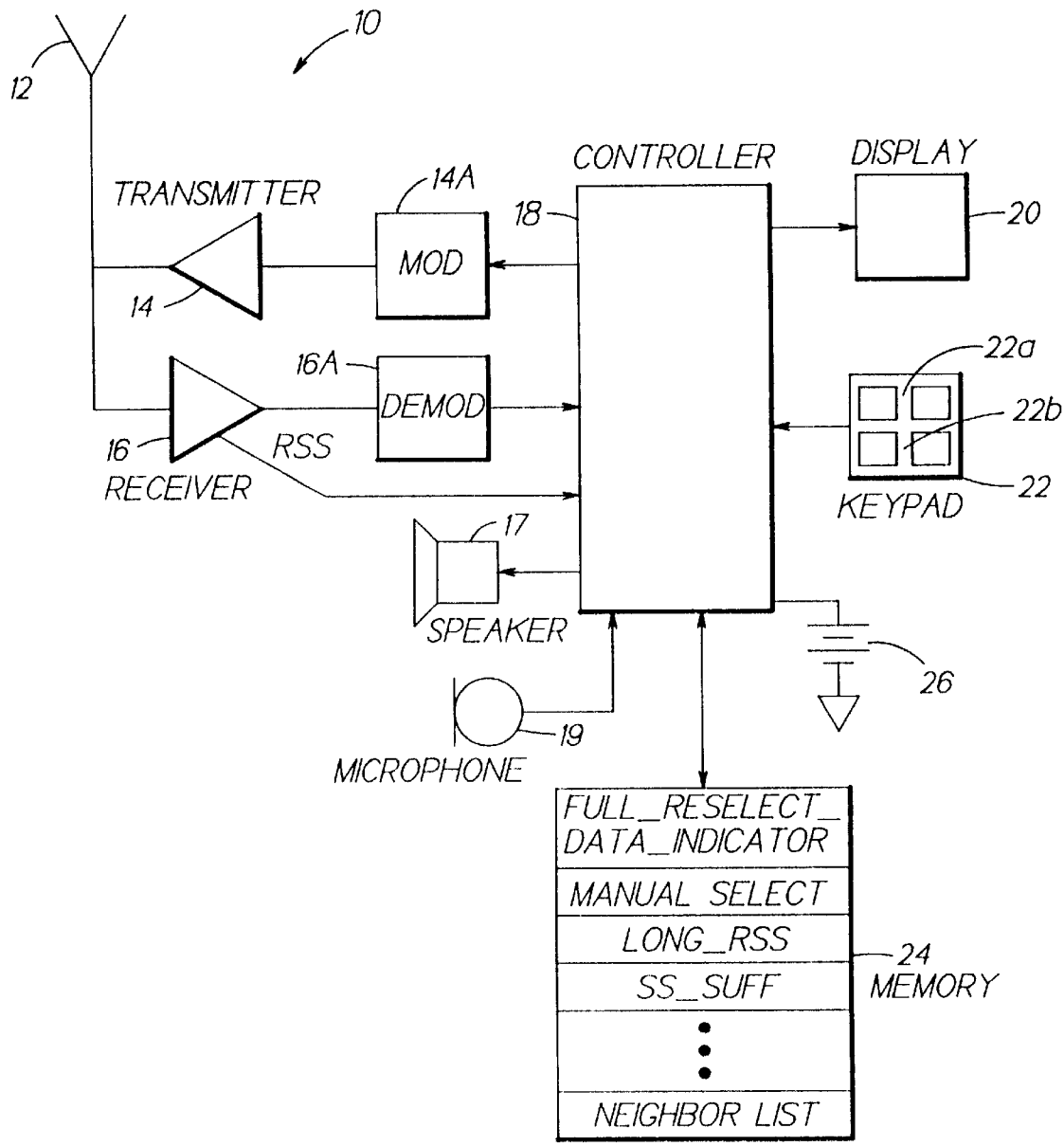
FIG. 1 is a block diagram of a mobile station that is constructed and operated in accordance with this invention.
Figure 2:
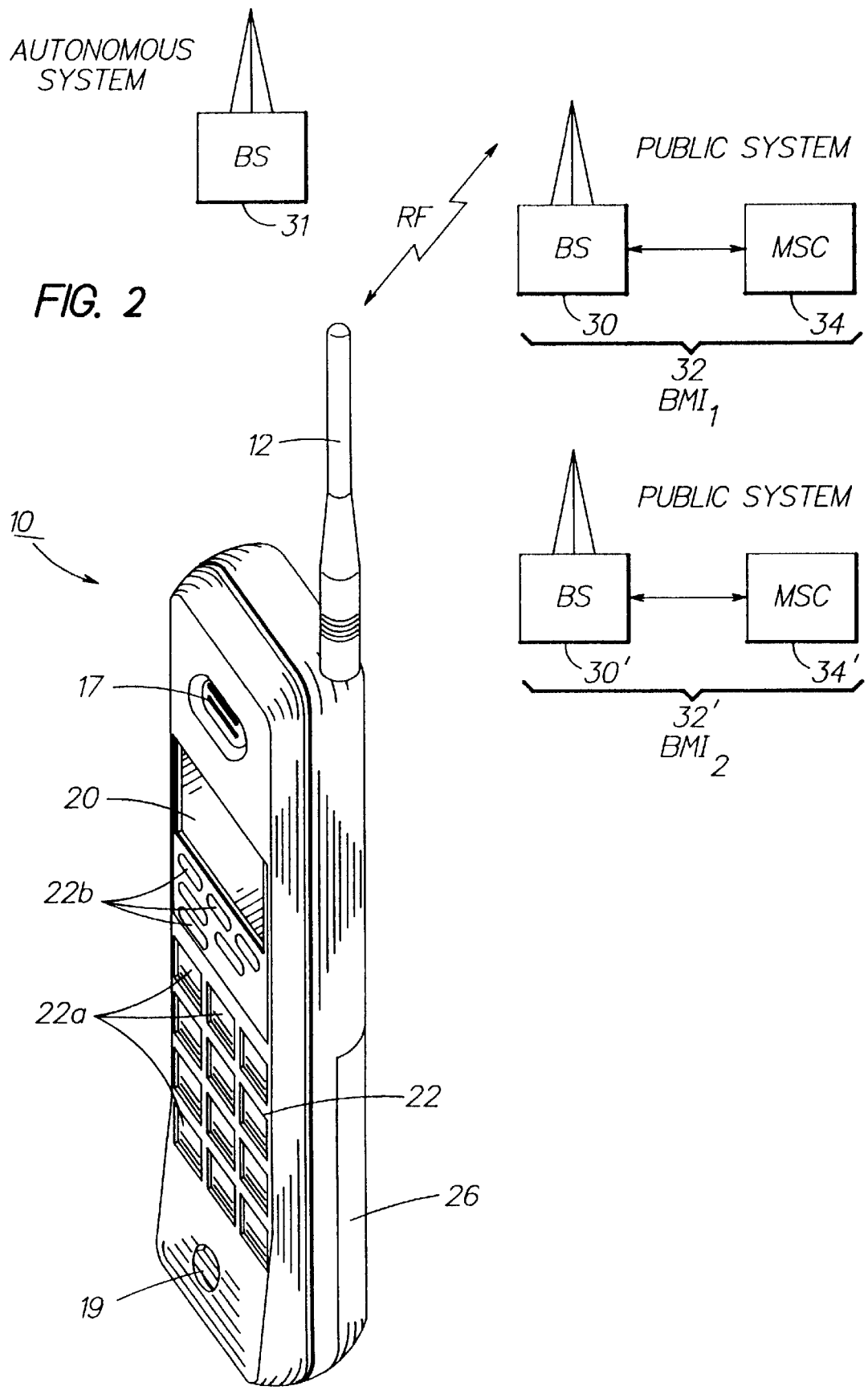
FIG. 2 is an elevational view of the mobile station shown in FIG. 1, and which further illustrates a plurality of cellular and other communication systems to which the mobile station can be bidirectionally coupled through wireless RF links.

Reference is first made to FIGS. 1 and 2 for illustrating a wireless user terminal or mobile station 10, such as but not limited to a cellular radiotelephone or a personal communicator, that is suitable for practicing this invention The mobile station 10 can be a vehicle mounted or a handheld device. The mobile station 10 includes an antenna 12 for transmitting signals to and for receiving signals from a first base site or base station 30. The base station 30 is a part of a first cellular public system comprising a BMI ($BMI_1$) 32 that includes a mobile switching center (MSC) 34. The MSC 34 provides a connection to landline trunks when the mobile station 10 is involved in a call.

FIG. 2 also shows a second $BMI_2$ 32', having associated base station(s) 30' and MSC 32'. By example, the $BMI_1$ 32 may be associated with a first digital public system (e.g., PCS1900 or GSM), and $BMI_2$ 32' may be associated with a second public system, such as analog system or another digital system. Both public systems have an associated and different System Identification (SID). If the two or more public systems are not the same (e.g., both digital TDMA systems that use the same air interface), then the mobile station 10 is assumed to have at least dual mode capability (e.g., digital TDMA and AMPS) so that it can operate in the different types of public systems.

FIG. 2 further illustrates a base station 31 that is associated with an autonomous system, such as a residential system having an associated Residential System Identification (RSID) or a private system having an associated Private System Identification (PSID).

The mobile station 10 of FIG. 1 includes a transceiver comprised of a modulator (MOD) 14A, a tuneable transmitter 14, a tuneable receiver 16, a demodulator (DEMOD) 16A, and a controller 18 that provides signals to and receives signals from the transceiver. These signals include signalling information in accordance with the air interface standard of the applicable cellular system, and also user speech and/or user generated data. As was indicated above, the transmitter, receiver, modulator and demodulator may be at least dual-mode capable, and may operate with the frequencies, modulation type, access type, etc. of several of the various public and private systems in the environment of the mobile station 10. A Received Signal Strength (RSS) signal is output from the receiver 16 to the controller 18, typically from an IF stage.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities A battery 26 is provided for powering the various circuits that are required to operate the mobile station 10.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The user interface is employed by the user to manually select a desired system, as was described above.

The mobile station 10 also includes various memories, shown collectively as the memory 24, wherein are stored a plurality of constants and variables that are used by the controller 18 during the operation of the mobile station 10. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user. The memory 24 typically stores a list of channels to be measured (Neighbor List), one or more SIDs, RSIDs, PSIDs, as described above, as well as various flags and parameters received in signalling messages from the BMI of the currently selected system Of particular significance to this invention are a Full-Reselect-Data-Indicator flag, a Manual Select flag that is set for indicating if the current system was manually selected by the user, a Long_RSS value that is calculated by the controller 18 from a plurality of RSS readings, and a Sufficient Signal Strength value (SS_SUFF).

The operating program stored in the memory 24 may include routines to present messages and message-related functions to the user on the display 20, typically as various menu items. These include a capability to enable the user to select a desired system for operation. The memory 24 also includes routines for implementing the method described below in relation to FIG. 3.

With regard to the data and flags stored in the memory 24, it is noted that IS-136.1, Section 6.3.3.3, entitled "Signal Strength Measuring and Processing", specifies that the mobile station 10 is to keep a running average of the last five signal strength measurements (Long_RSS) for each measured frequency Additionally, the mobile station 10 is to keep a running average of the last two signal strength measurements of the current DCCH (Short_RSS) Both of these values are used for control channel reselection purposes (see Section 6.3.3.4). The interval of signal strength measurements for any given frequency is determined by a measurement_interval parameter (see Sections 6.3.3.1 and 6.3.3.2).

When the mobile station 10 first camps on a control channel the Full_Reselect_Data_Indicator is reset. After collecting five signal strength measurements for each viable Neighbor List entry, the Full_Reselect_Data_Indicator flag is set to show that valid Long_RSS values are available, and that the corresponding Neighbor list control channels can be considered for reselection purposes.

The mobile station 10 is also required to collect five signal strength measurements for the POFs, which may be referred to as Non-Public System DCCHs (NPS-DCCHs), that it has identified as requiring measurements, before the POFs can be considered for reselection purposes.

The SS_SUFF parameter is broadcast on the F-BCCH in a Control Channel Selection Parameters message (Section 6.4.1.2.1.1), and in other messages, and is used in the Candidate Eligibility Filter (CEF) procedure specified in Section 6.3.3.4.2.

A Neighbor Cell List (TDMA and Analog) is transmitted to the mobile station 10 in an E-BCCH message (see Section 6.4.1.2.1.1).

These various parameters and flags are stored in the memory 24 for use by the controller 18 in implementing the air interface described in IS-136, and are further utilized in accordance with this invention as described below.

In accordance with an embodiment of this invention, and referring to FIG. 3, the operation of the mobile station 10 in the DCCH Camping State, in particular the Periodic Evaluation state described previously, is modified as follows.

At Block A it is assumed that the mobile station 10 is in the DCCH Camping State, and that the Periodic Evaluation Condition is fulfilled The mobile station 10 then exits the DCCH Camping State and enters Block B, where a determination is made if the Full_Reselect_Data_Indicator flag has been set. If No, control passes back to Block A.

If Yes, and in accordance with this invention, control passes instead to Block C to determine if the Manual Select flag is set, thereby indicating that the current system associated with the DCCH that the mobile station 10 is presently camped on was manually selected by the user. If No, control passes to Block D to perform the Periodic Evaluation procedure in a conventional manner. That is, Candidate Eligibility Filtering procedure (Section 6.3.3.4.2) is executed to search for another, stronger DCCH. Control may return to Block A if no suitable candidate DCCH is located, or reselection may occur, resulting in the mobile station 10 eventually camping on the reselected DCCH.

However, is the determination step results in a Yes at Block C, indicating that the current channel was manually selected, control passes to Block E where the controller 18 makes a determination as to whether the value of Long_RSS for the current channel ($Long\_RSS_{CURRENT}$) is equal to or less than the presently specified sufficient signal strength ($SS\_SUFF_{CURRENT}$). If Yes, indicating that the signal strength of the system previously manually selected by the user is marginal or unacceptable, then control passes to Block D to perform the Periodic Evaluation procedure. However, if the result of the test at Block E is No, then the execution of Block D is skipped, and control passes back to Block A to remain camped on the current DCCH.

In this manner the mobile station 10 remains on the system that was previously manually selected by the user, until such time that the value of $Long\_RSS_{CURRENT}$ indicates that the mobile station should begin evaluating other channels, or until such time that the user desires to deactivate manual selection. In this latter case the mobile station 10 returns to the "automatic." mode, meaning that the mobile station 10 begins performing the Periodic Evaluation procedure in a conventional manner.

The above-mentioned problem of quickly leaving a system that was manually selected by the user for another system, having a stronger DCCH, is thus eliminated.

During the time that the execution of the Periodic Evaluation procedure is modified as described above the mobile station 10 is still responsive to the other specified reselection trigger conditions (e.g., RTC1:Radio Link Failure Condition, RTC2:Cell Barred Condition, etc.), specified in Section 6.3.3.4.1, for invoking the Candidate Eligibility Filtering procedure.

Although described in the context of preferred embodiments, it should be realized that a number of modifications to these teachings may occur to one skilled in the art. By example, the teaching of this invention is not limited for use only with systems constructed and operated in accordance with IS-136, or only with digital TDMA cellular systems.

Thus, while the invention has been particularly shown and described with respect to preferred embodiments thereof, it will be understood by those skilled in the art that changes in form and details may be made therein without departing from the scope and spirit of the invention.

What is claimed is:

1. A mobile station, comprising:
   a RF transceiver for bidirectionally communicating with base stations of radio communications systems;
   a user interface;
   a memory for storing information, the stored information including a minimum received signal strength threshold; and
   a controller coupled to an output of said transceiver, to said user interface, and to said memory,
   said controller operating under the control of a stored program in said memory for placing the mobile station in a camping state for receiving a control channel of a radio communications system;
   said controller further operating for selectively evaluating one or more other control channels based on (a) a determination of whether a current control channel on which the mobile station is camped is associated with a radio communication system that was manually selected by a user, and (b) a comparison of a received signal strength indication of the current control channel to the minimum received signal strength threshold, whereby said mobile station remains camped on the control channel of the manually selected radio communication system until such time that the received signal strength indicator falls below the minimum received signal strength threshold.

2. A mobile station as in claim 1, wherein said controller compares a received signal strength indication, that is derived from a plurality of received signal strength measurements of the current control channel, to a minimum received signal strength threshold that is received in a message from a radio communications system.

3. A method for operating a mobile station, comprising steps of:
   placing the mobile station in a camping state for receiving a control channel of a communications system;
   prior to executing an evaluation of at least one other channel, determining if the current communications system was manually selected by a user;
   if not, executing the evaluation of the at least one other channel; else
   if the current communications system was manually selected by the user, determining if the signal strength of the control channel is equal to or less than a threshold signal strength;
   if the signal strength of the control channel is equal to or less than the threshold signal strength, executing the evaluation of the at least one other channel; else
   if the signal strength of the control channel is greater than the threshold signal strength, returning to the camping state without executing the evaluation of the at least one other channel.

4. A method as in claim 3, wherein the step of determining if the signal strength of the control channel is equal to or less than a threshold signal strength compares a received signal strength value that is derived from a plurality of received signal strength measurements of the current control channel to a threshold value received in a message from the current communications system.

5. A mobile station, comprising:
   a RF transceiver for bidirectionally communicating with base stations of public or autonomous communications systems;
   a user interface for displaying information to a user and for receiving an input from a user;
   a memory for storing information, the stored information including information indicating a minimum sufficient signal strength threshold; and
   a controller coupled to an output of said transceiver, to said user interface, and to said memory,
   said controller operating under the control of a stored program in said memory for placing the mobile station in a camping state for receiving a control channel of a communications system;
   said controller further operating, prior to executing an evaluation of at least one other channel, for determining if a current communications system was manually selected by a user using said user interface and, if not, for executing the evaluation of the at least one other channel; else if the current communications system was manually selected by the user, said controller instead determining if the signal strength of the control channel is equal to or less than said stored minimum sufficient signal strength threshold; if the signal strength of the control channel is determined to be equal to or less than said stored threshold signal strength, said controller executing the evaluation of the at least one other channel; else if the signal strength of the control channel is greater than said stored threshold signal strength, said controller instead operating to return to the camping state without executing the evaluation of the at least one other channel.

6. A mobile station as in claim 5, wherein said controller compares a received signal strength value that is derived from a plurality of received signal strength measurements of the current control channel to said threshold value that is received in a message from the current communications system.

* * * * *